US010015222B2

(12) United States Patent
Pakulski et al.

(10) Patent No.: US 10,015,222 B2
(45) Date of Patent: Jul. 3, 2018

(54) SYSTEMS AND METHODS FOR SELECTIVE RETRIEVAL OF ADAPTIVE BITRATE STREAMING MEDIA

(71) Applicant: Seawell Networks, Inc., Suwanee, GA (US)

(72) Inventors: Christoph Pakulski, Mississauga (CA); Robert Linwood Myers, Mississauga (CA)

(73) Assignee: ARRIS Canada, Inc., Suwanee, GA (US)

( * ) Notice: Subject to any disclaimer, the term of this patent is extended or adjusted under 35 U.S.C. 154(b) by 489 days.

(21) Appl. No.: 14/038,008

(22) Filed: Sep. 26, 2013

(65) Prior Publication Data

US 2015/0088965 A1 Mar. 26, 2015

(51) Int. Cl.
| | |
|---|---|
| G06F 15/16 | (2006.01) |
| H04L 29/06 | (2006.01) |
| H04N 21/2387 | (2011.01) |
| H04N 21/61 | (2011.01) |
| H04N 21/637 | (2011.01) |
| H04N 21/643 | (2011.01) |
| H04N 21/84 | (2011.01) |
| H04N 21/845 | (2011.01) |
| H04L 29/08 | (2006.01) |

(52) U.S. Cl.
CPC .......... *H04L 65/60* (2013.01); *H04L 65/4084* (2013.01); *H04L 65/4092* (2013.01); *H04L 65/608* (2013.01); *H04L 65/80* (2013.01); *H04L 67/02* (2013.01); *H04N 21/2387* (2013.01); *H04N 21/6175* (2013.01); *H04N 21/637* (2013.01); *H04N 21/64322* (2013.01); *H04N 21/84* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 6,128,653 A | 10/2000 | del Val et al. | |
| 7,486,873 B2 | 2/2009 | Kim et al. | |
| 7,644,172 B2 | 1/2010 | Stewart et al. | |

(Continued)

FOREIGN PATENT DOCUMENTS

| | | |
|---|---|---|
| WO | 2012/033339 A2 | 3/2012 |
| WO | WO 2013030096 A1 * | 3/2013 |

OTHER PUBLICATIONS

PCT Search Report and Written Opinion, Re: Application No. PCT/US2014/056900, dated Dec. 3, 2014.

*Primary Examiner* — Brian Whipple
(74) *Attorney, Agent, or Firm* — Stewart M. Wiener

(57) ABSTRACT

Methods and apparatus that enable a subscriber of an adaptive bitrate streaming service provider to begin viewing a live program already in progress, and further have the ability to pause, rewind or start the program over from the beginning of the program regardless of its actual length or the manifest window defined by an encoder. Selective retrieval of a live media stream is provided by storing, at a server, a plurality of media fragments beginning at an initial time along with a server manifest for the media stream. In response to a client request for a start time later than the initial time, the server generates a program-specific manifest based on the server manifest.

16 Claims, 3 Drawing Sheets

(56) References Cited

U.S. PATENT DOCUMENTS

| | | | |
|---|---|---|---|
| 7,886,070 B2 | 2/2011 | Westerink et al. | |
| 8,015,480 B2 | 9/2011 | Abbott et al. | |
| 8,090,718 B2 | 1/2012 | Xu | |
| 8,234,350 B1 | 7/2012 | Gu et al. | |
| 8,964,977 B2* | 2/2015 | Ziskind et al. | 380/200 |
| 9,537,967 B2* | 1/2017 | Knox | H04L 67/2823 |
| 2002/0042833 A1* | 4/2002 | Hendler | H04L 29/06027 |
| | | | 709/231 |
| 2003/0237050 A1* | 12/2003 | Davidov | G06F 8/30 |
| | | | 715/234 |
| 2004/0158579 A1 | 8/2004 | Gopalakrishnan | |
| 2006/0047772 A1* | 3/2006 | Crutcher | H04L 67/02 |
| | | | 709/212 |
| 2008/0168516 A1 | 7/2008 | Flick et al. | |
| 2008/0244658 A1 | 10/2008 | Chen | |
| 2010/0135636 A1 | 6/2010 | Zhang et al. | |
| 2010/0195974 A1 | 8/2010 | Zheng et al. | |
| 2010/0235528 A1* | 9/2010 | Bocharov et al. | 709/231 |
| 2011/0296048 A1* | 12/2011 | Knox et al. | 709/231 |
| 2011/0307781 A1 | 12/2011 | Sood et al. | |
| 2012/0110138 A1 | 5/2012 | Zhang | |
| 2012/0174167 A1 | 7/2012 | Walters et al. | |
| 2012/0180100 A1 | 7/2012 | Kim | |
| 2013/0332916 A1* | 12/2013 | Chinn | G06F 8/65 |
| | | | 717/169 |
| 2014/0010517 A1* | 1/2014 | Sheffler | H04N 9/79 |
| | | | 386/226 |
| 2014/0040496 A1* | 2/2014 | Moorthy et al. | 709/231 |
| 2014/0258463 A1* | 9/2014 | Winterrowd et al. | 709/219 |
| 2014/0344468 A1* | 11/2014 | Saremi | 709/231 |

\* cited by examiner

SYSTEMS AND METHODS FOR SELECTIVE RETRIEVAL OF ADAPTIVE BITRATE STREAMING MEDIA

FIELD

The described embodiments relate to streaming media on data networks and, in particular, to facilitating retrieval of adaptive bitrate streaming media.

INTRODUCTION

The delivery of broadcast television programming has traditionally been carried out using live radiofrequency (RF) transmission of scheduled programs over-the-air (OTA) or over a cable distribution network. However, many service providers are increasingly delivering video content to non-traditional devices using wired or wireless data networks such as the Internet. Examples of non-traditional devices for the delivery of broadcast programming include personal computers, tablets, smartphones and other mobile devices.

When delivering content over data networks, service providers generally use adaptive bitrate streaming solutions in conjunction with the Hypertext Transfer Protocol (HTTP) commonly used on the Internet. These solutions include Apple HTTP Live Streaming (HLS), Microsoft Smooth Streaming, Adobe HTTP Dynamic Streaming and Motion Picture Experts Group (MPEG) Dynamic Adaptive Streaming over HTTP (DASH).

In general, adaptive bitrate streaming is designed to work well over a best effort type of network such as the Internet, where resources are not necessarily provisioned for the delivery channel. Depending on the current state of the network, the most optimum bitrate is selected. Content distribution networks are very often employed to efficiently distribute media files to a plurality of edge servers.

In operation, each adaptive bitrate streaming works by monitoring client parameters such as bandwidth and/or processing ability, and adjusting the quality of the stream that is delivered in response to the detected bandwidth and processing ability. Quality can be adjusted based on a number of parameters, such as bitrate and resolution.

Each source stream is encoded at multiple quality levels, generally at different bitrates. During a streaming session, the client may switch between quality levels depending on available bandwidth and processing power.

For example, if a stream is being delivered at a quality level that requires a higher bitrate than is available at the client, the client may switch to a lower bitrate portion of the stream. This may prevent stuttering or stalls in the stream, and reduce the buffering time required to play back the stream, regardless of connection quality.

Generally, adaptive bitrate streaming approaches segment streams into parts, which may be several seconds long, for example. The client receives a manifest that identifies each of these parts the respective quality levels or bitrates available for each part. Typically, the client may begin streaming at the lowest quality level, to ensure a rapid start time with minimal buffering. If additional bandwidth is available at the client, the client may gradually step up quality levels for each successive part of the stream. If the client determines that available bandwidth or processing power is exceeded, it may reduce quality level for the next part of the stream.

SUMMARY

In a first broad aspect, there is provided a method of providing selective retrieval of a live media stream, the media stream formed of a plurality of fragments, the method comprising: storing the plurality of fragments beginning at an initial time; storing at least one manifest for the media stream beginning at the initial time; receiving, from a client device, a request for a portion of the media stream beginning at a selected start time later than the initial time; generating a program-specific manifest based on the at least one manifest, wherein a first manifest entry for a first fragment in the program-specific manifest corresponds to a selected fragment in the plurality of fragments at the selected start time; and providing the program-specific manifest to the client device. In some cases, the method further comprises receiving the plurality of fragments from a media server. In some cases, the method further comprises receiving the at least one manifest from a media server.

In some cases, the media server is an adaptive bitrate streaming server.

In some cases, the method further comprises providing a request URL for the portion of the media stream to the client device. In some cases, the request URL comprises a token that identifies the portion of the media stream. In some cases, the token identifies the selected start time. In some cases, the token identifies a rewind window from a current time to the selected start time. In some cases, the token comprises an authorization to provide the portion of the media stream. In some cases, the request URL is provided by an interface server.

In some cases, the method further comprises periodically generating the at least one manifest for a preselected number of the plurality of fragments, prior to storing the at least one manifest. In some cases, generating the program-specific manifest further comprises inserting at least one manifest entry for a media fragment related to a different media stream.

In some cases, the media stream is an HTTP Live Streaming stream, wherein the at least one manifest comprises a plurality of manifests each relating to a manifest window, and the program-specific manifest may be generated by identifying a subset of the plurality of manifests that contain fragments beginning at the selected start time, and extracting the manifest entries beginning at the selected start time from the subset.

In some cases, the media stream is a Smooth Streaming stream, the at least one manifest comprises an initial manifest, and the program-specific manifest may be generated beginning from the initial manifest using the plurality of fragments.

In accordance with another broad aspect, there is provided a manifest modification server for providing selective retrieval of a live media stream over a data network, the media stream formed of a plurality of fragments, the fragments stored at a media server beginning at an initial time, the server comprising: a network interface operatively coupled to the data network; a memory; and a processor operatively coupled to the memory and the network interface, the processor configured to: store at least one manifest for the media stream beginning at the initial time; receive, from a client device, a request for a portion of the media stream beginning at a selected start time later than the initial time; generate a program-specific manifest based on the at least one manifest, wherein a first manifest entry for a first fragment in the program-specific manifest corresponds to a selected fragment in the plurality of fragments at the selected start time; and transmit the program-specific manifest to the client device.

In accordance with yet another broad aspect, there is provided a non-transitory computer readable medium for storing instructions executable by a computer processor, the instructions when executed for causing the computer processor to perform a method of providing selective retrieval of a live media stream, the media stream formed of a plurality of fragments, the method comprising: storing the plurality of fragments beginning at an initial time; storing at least one manifest for the media stream beginning at the initial time; receiving, from a client device, a request for a portion of the media stream beginning at a selected start time later than the initial time; generating a program-specific manifest based on the at least one manifest, wherein a first manifest entry for a first fragment in the program-specific manifest corresponds to a selected fragment in the plurality of fragments at the selected start time; and providing the program-specific manifest to the client device.

BRIEF DESCRIPTION OF THE DRAWINGS

The drawings included herewith are for illustrating various examples of articles, methods, and apparatuses of the teaching of the present specification and are not intended to limit the scope of what is taught in any way.

In the drawings.

Figure 1:
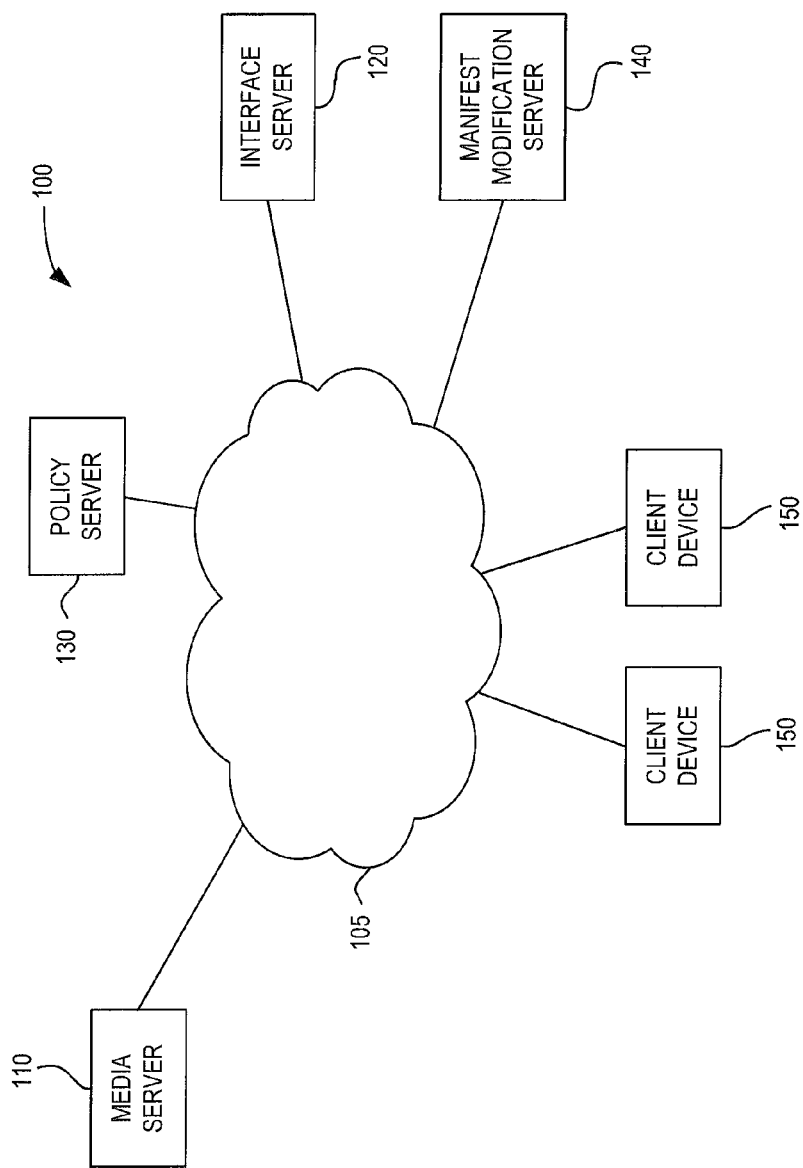
FIG. 1 illustrates an example system for transmitting and receiving streaming media content.

The drawings are provided for the purposes of illustrating various aspects and features of the example embodiments described herein.

DESCRIPTION OF EXEMPLARY EMBODIMENTS

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art.

Embodiments of the methods, systems and devices described herein may be implemented in hardware or software, or a combination of both. However, preferably, these embodiments are implemented in computer programs executing on programmable computers each comprising at least one processor, a data storage system (including volatile and non-volatile memory and/or storage elements), at least one input device, and at least one output device. For example and without limitation, the programmable computers may be network servers. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or optical disc) readable by a general or special purpose programmable computer, for configuring and operating the computer when the storage media or device is read by the computer to perform the procedures described herein.

Furthermore, the described embodiments are capable of being distributed in a computer program product comprising a physical, non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Generally, adaptive bitrate streaming (ABS) approaches for live programming may impose a limit on the size of a manifest file, which in turn limits the length of time a subscriber can rewind within the stream, particularly if the subscriber does not view the live stream in its entirety from the beginning. This phenomenon may be referred to as the "manifest window" for the stream. For example, if a subscriber begins viewing a stream at minute 30, but the manifest contains only 10 minutes of stream data, then the subscriber will be unable to "rewind" within the stream to the start of the live stream.

Generally, the manifest window is defined at the encoder and remains static once defined. However, in practice, many live streams vary in length, and may not correspond exactly to the manifest window defined at an encoder. For example, one television program may be 30 minutes in length, while another may be 60 minutes in length. Still another television program may be of variable length (e.g., a sports event).

The described embodiments generally enable a subscriber of an adaptive bitrate streaming service provider to begin viewing a live program already in progress, and further have the ability to pause, rewind or start the program over from the beginning of the program regardless of its actual length or the manifest window defined by an encoder.

Presently, there is a large installed base of ABS clients and it would be inconvenient to require that all client software be updated to take advantage of the described rewind ability. The described embodiments are generally backward compatible with existing client software.

Referring now to FIG. 1, there is illustrated an example system 100 for transmitting and receiving streaming media content such as live programs. System 100 comprises a network 105, one or more media servers 110, an interface server 120, a manifest modification server (MMS) 140 and one or more client devices 150. Optionally, a policy server 130 may be provided.

Network 105 can be a data network comprised of one or more private and public networks, such as the Internet. For ease of illustration, only one network 105 is shown. However, it will be understood that various parts of system 100 may be linked by different segments of a large interconnected network 105. For example, media server 110 may be linked to interface server 120 by a high-speed virtual private network (VPN), while client device 150 may be linked to interface server 120 via a cable distribution network and/or the public Internet.

Media server 110 is generally a network server configured to transmit live ABS streams, and with data storage for storing the stream content after transmission. Streams may comprise, for example, audio and video files in the MPEG-4 Advanced Video Coding (AVC) format. Media server 110 generally has a network interface, memory and a processor configured to provide the media content using an HTTP-based adaptive streaming protocol, such as Apple HLS, Microsoft Smooth Streaming, or the like.

In addition to storing stream audio and video files, media server 110 may periodically generate manifest files corresponding to the ABS protocol in use. That is, if media server 110 is using Apple HLS, it may periodically generate HLS manifest files for each stream that represent the stored asset, and which provide metadata regarding the start time of the stored asset.

In some embodiments, media server 110 may also encode the ABS streams from source content, such as that from an RF broadcast. In other embodiments, media server 110 may receive encoded ABS streams from another source (not shown).

Interface server 120 is generally a network server configured to provide a user interface to the client for the selection and playback of streams. In at least some embodiments, interface server 120 may have a network interface, memory and a processor configured to provide an HTTP server.

In general, interface server 120 provides an interface to the client in the form of resources (e.g., web pages) that that include uniform resource locators (URLs) corresponding to streams and playback actions. Interface server 120 receives requests from the client in the form of selected URLs. Interface server 120 may generate specific program and timing parameters (e.g., program start/stop times) for inclusion in the resources supplied to the client, or may be linked with another component (e.g., Electronic Program Guide (EPG), Content Management System (CMS)) that supplies this information. In some embodiments, a separate policy server 130 may be used to provide timing parameters for client sessions.

Manifest modification server (MMS) 140 is a network server configured to receive one or more requests for a specific program, for example as identified in an EPG, retrieve the manifest file or files corresponding to the specific program from media server 110, and generate a program-specific manifest file for delivery to the client. In operation, the request for the specific program may be received directly from a client device 150 in the form of a URL, where that URL originates at the interface server 120.

In some embodiments, MMS 140 may be integrated with interface server 120 or, optionally, with another element such as media server 110.

Client devices 150 are generally network-enabled multimedia playback devices, such as a personal computer, tablet computer, smartphone, network-enabled television or media player, or the like. Each client device 150 generally has a network interface, a memory and a processor that can be configured to retrieve media content over a network using an ABS delivery format, and to decode the content for playback to a user.

For example, in one embodiment, client device 150 can be configured to retrieve the media content using the Apple HLS delivery format.

In the described embodiments, both media server 110 and client device 150 can continue to operate in a conventional way without any modification. That is, media server 110 can be a conventional HTTP server (e.g., Apple HLS or other), and client device can be the corresponding client. However, interface server 120 and MMS 140 can co-operate to provide selective playback ability as described herein.

As described herein, a conventional encoder may be configured to generate manifest files for a fixed manifest window. However, a client may wish to rewind within the stream beyond the manifest window, to the start of a program.

MMS 140 may be configured to generate a program-specific manifest file in which the first fragment in the manifest corresponds to the first fragment from the origin stream for the desired program. This capability may also be used to prevent rewinding into a program for which the client is not authorized by, e.g., policy server 130. For example, if the client is not authorized to view content rated "MA", generation of the program-specific manifest can prevent the client from doing so.

Figure 2:
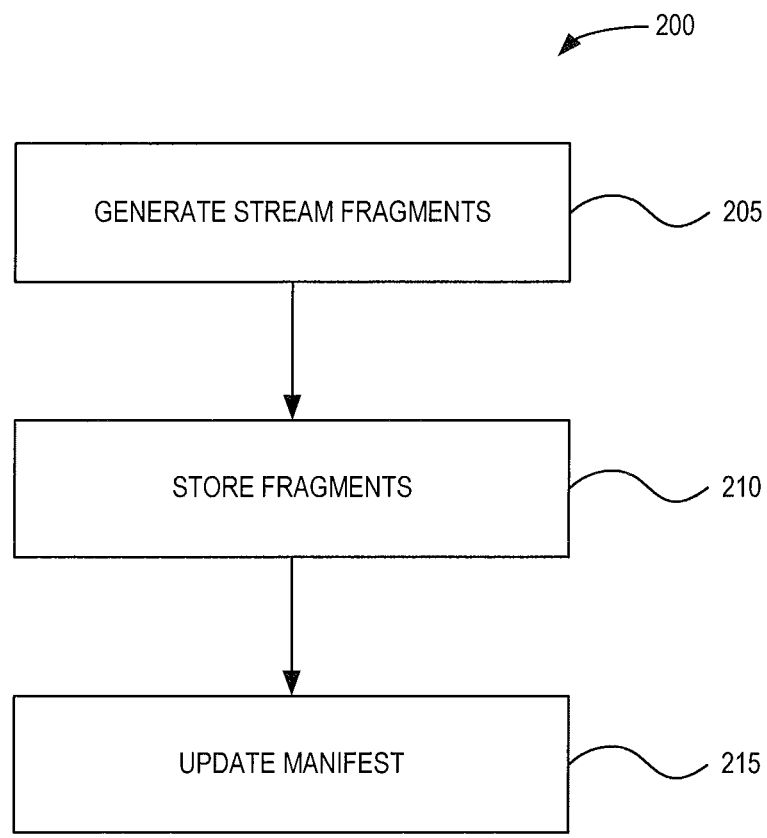
FIG. 2 illustrates a flow diagram for an example method of generating an adaptive bitrate stream.

Referring now to FIG. 2, there is illustrated a flow diagram for an example method of generating an adaptive bitrate stream. Method 200 may be carried out by a media server 110 with encoding capability, for example.

Method 200 begins at 205 with the server receiving stream content and the encoder generating one or more fragments at various bitrates or quality levels. The generated fragments are stored in a data store at 210, beginning at an initial time.

In some cases, such as in Apple HLS, a current manifest file may be updated at 215 to include the newly-generated fragments and to remove the oldest fragments, as described herein.

Media server may then return to 205 to generate further stream fragments.

In the case of Apple HLS, a current manifest file for a live stream generally contains a number of entries corresponding to the size of the manifest window. The manifest window in this case may be referred to as a "sliding window", because as new fragments are created they are added to the manifest, while old fragments are removed to keep the manifest a constant length. Thus, if the manifest window is 30 minutes and the fragment duration is 10 seconds, then the manifest will always contain 180 entries representing the fragments for 30 minutes of the stream. However, to facilitate rewinding to the start of a program that began 2 hours in the past, the manifest would need to contain 720 entries.

An example Apple HLS manifest file may have a filename such as net-Channel-A.m3u8, representing a linear live channel "A". The contents of the manifest for the manifest window may be as follows:

```
#EXTM3U
#EXT-X-TARGETDURATION:10
#EXT-X-ALLOW-CACHE:YES
#EXT-X-VERSION:2
#EXT-X-MEDIA-SEQUENCE:3001
#EXTINF:10,
High/segment3001.ts
#EXTINF:10,
High/segment3002.ts
#EXTINF:10,
High/segment3003.ts
.
.
.
#EXTINF:10,
High/segment3178.ts
#EXTINF:10,
High/segment3179.ts
#EXTINF:10,
High/segment3180.ts
```

After five minutes, the contents of the manifest for the manifest window may appear as follows:

```
#EXTM3U
#EXT-X-TARGETDURATION:10
#EXT-X-ALLOW-CACHE:YES
#EXT-X-VERSION:2
#EXT-X-MEDIA-SEQUENCE:3031
#EXTINF:10,
High/segment3031.ts
#EXTINF:10,
High/segment3032.ts
#EXTINF:10,
High/segment3033.ts
.
.
.
#EXTINF:10,
High/segment3208.ts
#EXTINF:10,
High/segment3209.ts
#EXTINF:10,
High/segment3210.ts
```

In the case of Microsoft Smooth Streaming, a current manifest file is requested by the client only once at the beginning of a stream. As the client exhausts the fragments specified in the manifest file, it uses information in the fragment itself to request the next fragment. Subsequently, the client is required to manage the manifest window internally, as it keeps track of the information required to request fragments from an earlier time.

For example, a Smooth Streaming manifest file may appear as follows:

```
<?xml version="1.0" ?>
- <SmoothStreamingMedia MajorVersion="2" MinorVersion="0"
Duration="0" TimeScale="10000000" IsLive="TRUE"
LookAheadFragmentCount="2" DVRWindowLength="36000000000"
CanSeek="TRUE" CanPause="TRUE">
- <StreamIndex Type="video" Name="video" Language="und"
Subtype="AVC1" Chunks="0" TimeScale="10000000"
Url="QualityLevels ({bitrate})/Fragments(video={start
time})">
    <QualityLevel Index="0" Bitrate="250000"
CodecPrivateData="000000016742E00D96540A0CFCF808140000000
168CE3880" FourCC="AVC1" MaxWidth="320" MaxHeight="180"
/>
    <QualityLevel Index="1" Bitrate="450000"
CodecPrivateData="000000016742E01596540F047F580E0A0000000
168CE3880" FourCC="AVC1" MaxWidth="480" MaxHeight="270"
/>
    <QualityLevel Index="2" Bitrate="850000"
CodecPrivateData="00000001674D401E965281405FF2E0205000000
00168EF3880" FourCC="AVC1" MaxWidth="640" MaxHeight="360"
/>
    <QualityLevel Index="3" Bitrate="1400000"
CodecPrivateData="00000001674D401E9652816067F780814000000
00168EF3880" FourCC="AVC1" MaxWidth="704" MaxHeight="396"
/>
    <QualityLevel Index="4" Bitrate="2700000"
CodecPrivateData="00000001674D401F965280A00B7602050000000
168EF3880" FourCC="AVC1" MaxWidth="1280" MaxHeight="720"
/>
    <c d="20000000" t="162000000000" />
    <c d="20000000" t="162020000000" />
    <c d="20000000" t="162040000000" />
    <c d="20000000" t="162060000000" />
.
.
.
    <c d="20000000" t=" 197940000000" />
    <c d="20000000" t=" 197960000000" />
    <c d="20000000" t=" 197980000000" />
    </StreamIndex>
- <StreamIndex Type="audio" Name="audio101_eng"
Language="eng" Subtype ="AACL" Chunks="0"
TimeScale="10000000"
Url="QualityLevels ({bitrate})/Fragments(audio101_eng={sta
rt time})">
    <QualityLevel Index="0" Bitrate="64000"
CodecPrivateData="1190" FourCC="AACL" AudioTag="255"
Channels="2" SamplingRate="48000" BitsPerSample="16"
PacketSize="4" />
    <c d="19840000" t=" 161993600000" />
    <c d="19840000" t=" 162013440000" />
    <c d="19840000" t=" 162033280000" />
    <c d="19840000" t=" 162053120000" />
.
.
.
    <c d="19840000" t=" 197943680000" />
    <c d="19840000" t=" 197963520000" />
    <c d="19840000" t=" 197983360000" />
    </StreamIndex>
    </SmoothStreamingMedia>
```

This manifest file represents a 1 hour manifest window. Subsequent entries can be inferred by the client.

Figure 3:
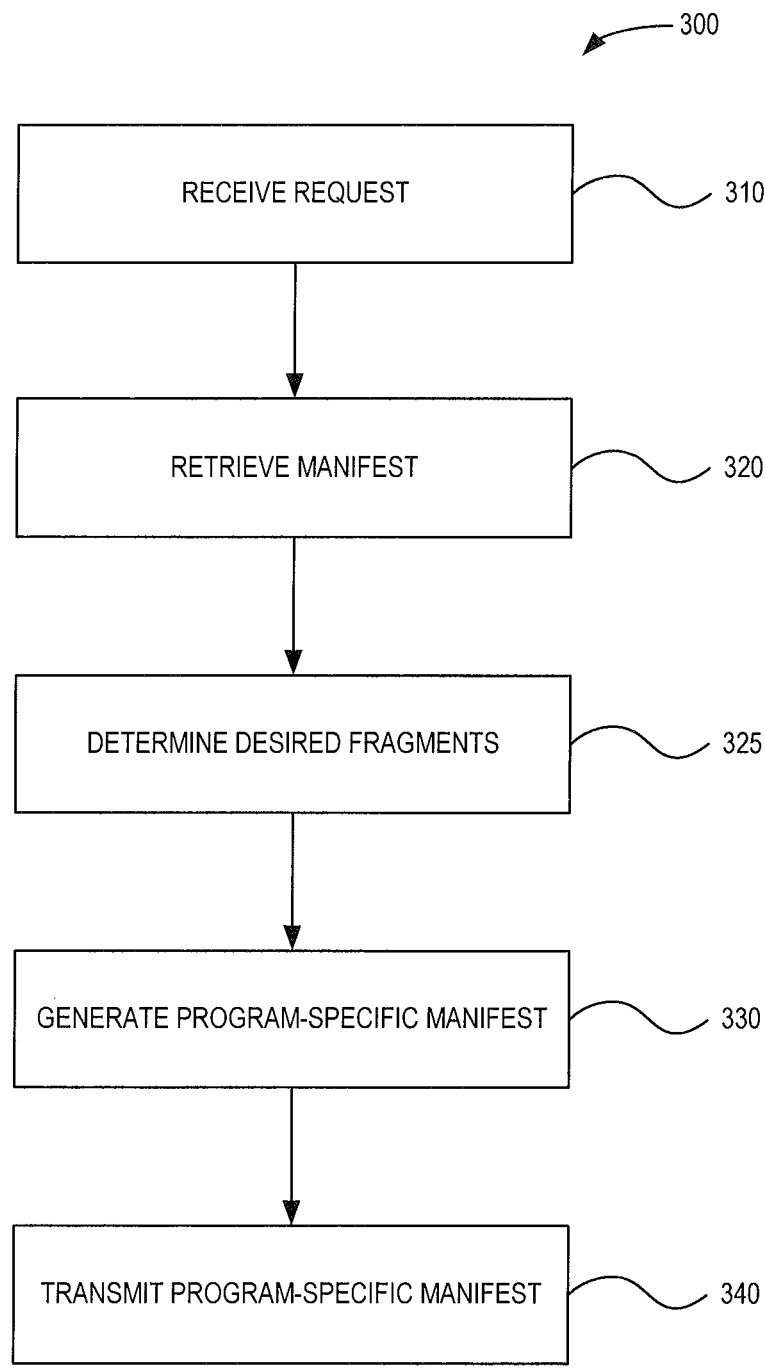
FIG. 3 illustrates a flow diagram for an example method of generating a program-specific manifest file to provide selective retrieval of a live media stream by a client.

Referring now to FIG. 3, there is illustrated a flow diagram for an example method of generating a program-specific manifest file to provide selective retrieval of a live media stream by a client. Method 300 may be performed, for example, by MMS 140.

Method 300 begins at 310 with MMS 140 receiving a request for a portion of a media stream, generally corresponding to a specific program of interest. The portion generally has a selected start time that begins after an initial time for which stream fragments are available at the media server.

The request may be in the form of a URL generated by, for example, interface server 120, and transmitted by a client device 150. Accordingly, the request may include a token identifying the selected start time, the rewind window from the current time to the selected start time, and an authorization to provide the portion (e.g., from policy server 130). The token may be in the form a URL parameter, as described herein.

For example if the current time is 8:15 pm and the start of a current program was 8:00 pm, the interface server 120 may generate a URL for the client device 150, which indicates that the client wishes to rewind 15 minutes within the stream from the current time. For example, in Apple HLS the URL may be formulated as:

http://mms.example.com/net-Channel-A.m3u8?rewind-time=PT15M0S where "net-Channel-A.m3u8" is manifest identifier, and the parameter "rewind-time" indicates the desired rewind time (e.g., PT=present time, 15M=15 minutes, and 0S=0 seconds).

In another example, in Microsoft Smooth Streaming, the URL may be formulated as:

http://mms.example.com/net-Channel-A.isml/Manifest?rewind-time=PT15M0S where "net-Channel-A.isml/Manifest" is the manifest identifier, and the parameter "rewind-time" indicates the desired rewind time (e.g., PT=present time, 15M=15 minutes, and 0S=0 seconds).

In some other cases, rather than indicating a rewind time in the URL, the start time of the desired program may be indicated instead. For example, the following URL may be used for Apple HLS:

http://mms.example.com/net-Channel-A.m3u8?start=2013-04-05T20:00:00 Z where "net-Channel-A.m3u8" is manifest identifier, and the parameter "start" indicates that the live stream can be rewound to the point at which the live program commenced (i.e., 20:00.00).

At 320, MMS 140 retrieves a current manifest file for the media stream from media server 110, using the manifest identifier in the request URL. Optionally, MMS 140 may retrieve one or more media stream fragments, for example to extract information required to determine the next fragment in a sequence.

At 325, MMS 140 determines the fragments needed to enable rewinding to the start time of the desired program, based on the request URL.

Generally, determination of the desired fragments is based on knowledge of the past timeline for the stream, which is used to extract the names of fragment files corresponding to the desired start time of the program. In order to find which fragments correspond to a particular start time, any of several techniques may be used. For example, a current manifest, an archiving scheme, and an archive database can be used.

A current manifest can be used when the manifest window of the current manifest is sufficiently long to contain the start time of the desired program. Since the manifest generally specifies the length of fragments, it is possible to identify the start fragment corresponding to the start of a program using the current time and counting backwards. For example, if the start time of the program is 140 seconds in the past and each fragment has a length of 10 seconds, the start fragment can be identified by counting backwards 14 fragments from the current fragment.

Of course, this approach is limited in that it cannot identify fragments that are outside the manifest window.

The archival approach relies on periodic retrieval and storage of already-published fragments. For example, media server 110 may periodically (e.g., every hour) create a time-framed manifest listing all fragments created for a specific channel for the previous time period (e.g., hour). To facilitate retrieval, the time-framed manifests can be named according to the respective time frame they represent. Alternatively, the time-framed manifest can be identified in an index.

Optionally, published manifests can be stored in directories representing days (i.e., 24 hour periods), with each directory containing manifests for 1 hour periods. This can allow rewinding to an arbitrary point in the past. Various other archival and naming patterns can also be used.

Accordingly, the fragments desired can be determined by identifying a subset of a plurality of manifests that contain fragments beginning at the selected start time, and extracting the manifest entries beginning at the selected start time from the subset.

In some cases, an archive database (e.g., a server that supports Structured Query Language (SQL)) can be used to store time-framed manifests or simply fragment data. Accordingly, fragments for a program-specific manifest can be identified by issuing a suitable database command.

For Apple HLS, a fragment pattern can also be determined by identifying a sequential numbering scheme for fragments within a single manifest. In Microsoft Smooth Streaming, the fragment pattern can be inferred from a manifest provided once at the start of the session. As the fragments explicitly identified in the manifest are exhausted, information in the fragments themselves can be used to request the next fragment.

At 330, MMS 140 generates a program-specific manifest based on the retrieved manifest file and the fragment pattern. Generally, a first manifest entry for a first fragment in the program-specific manifest corresponds to a selected fragment in the media stream at the selected start time (e.g., the scheduled program start time).

For example, to generate a program-specific manifest in Apple HLS that allows beginning playback with a 15 minute rewind time, the following manifest file may be used:

```
#EXTM3U
#EXT-X-TARGETDURATION:10
#EXT-X-ALLOW-CACHE:YES
#EXT-X-VERSION:2
#EXT-X-MEDIA-SEQUENCE:3142
#EXTINF:10,
High/segment3142.ts
#EXTINF:10,
High/segment3143.ts
#EXTINF:10,
High/segment3144.ts
#EXTINF:10,
High/segment3145.ts
.
.
.
#EXTINF:10,
High/segment3230.ts
#EXTINF:10,
High/segment3231.ts
#EXTINF:10,
High/segment3232.ts
```

In order to allow the client to always rewind to the start of the program, the manifest modification server 140 generates manifest files that generally grow over time, as opposed to maintaining a fixed-length sliding window. In other words, as new fragments are added, old fragments are retained. For example, after another 5 minutes of viewing the manifest delivered to the client may appear as follows:

```
#EXTM3U
#EXT-X-TARGETDURATION:10
#EXT-X-ALLOW-CACHE:YES
#EXT-X-VERSION:2
#EXT-X-MEDIA-SEQUENCE:3142
#EXTINF:10,
High/segment3142.ts
#EXTINF:10,
High/segment3143.ts
#EXTINF:10,
High/segment3144.ts
#EXTINF:10,
High/segments 145.ts
.
.
.
#EXTINF:10,
High/segment3260.ts
#EXTINF:10,
High/segment3261.ts
#EXTINF:10,
High/segment3262.ts
```

In some cases, the size of the manifest may be capped at some predetermined value, which may be configurable by a service provider.

In another example, to generate a program-specific manifest in Microsoft Smooth Streaming that allows beginning playback with a 15 minute rewind time, the following manifest file may be used:

```
<?xml version="1.0" ?>
- <SmoothStreamingMedia MajorVersion="2" MinorVersion="0"
Duration="0" TimeScale="10000000" IsLive="TRUE"
LookAheadFragmentCount="2" DVRWindowLength="36000000000"
CanSeek="TRUE" CanPause="TRUE">
- <StreamIndex Type="video" Name="video" Language="und"
```

-continued

```
Subtype="AVC1" Chunks="0" TimeScale="10000000"
Url="QualityLevels ({bitrate})/Fragments(video={start
time})">
    <QualityLevel Index="0" Bitrate="250000"
CodecPrivateData="000000016742E00D96540A0CFCF808140000000
168CE3880" FourCC="AVC1" MaxWidth="320" MaxHeight="180"
/>
    <QualityLevel Index="1" Bitrate="450000"
CodecPrivateData="000000016742E01596540F047F580E0A0000000
168CE3880" FourCC="AVC1" MaxWidth="480" MaxHeight="270"
/>
    <QualityLevel Index="2" Bitrate="850000"
CodecPrivateData="00000001674D401E9652814405FF2E0205000000
00168EF3880" FourCC="AVC1" MaxWidth="640" MaxHeight="360"
/>
    <QualityLevel Index="3" Bitrate="1400000"
CodecPrivateData="00000001674D401E9652816067F780814000000
00168EF3880" FourCC="AVC1" MaxWidth="704" MaxHeight="396"
/>
    <QualityLevel Index="4" Bitrate="2700000"
CodecPrivateData="00000001674D401F965280A00B7602050000000
168EF3880" FourCC="AVC1" MaxWidth="1280" MaxHeight="720"
/>
    <c d="20000000" t="189000000000" />
    <c d="20000000" t="189020000000" />
    <c d="20000000" t="189040000000" />
    <c d="20000000" t="189060000000" />
    .
    .
    .
    <c d="20000000" t=" 197940000000" />
    <c d="20000000" t=" 197960000000" />
    <c d="20000000" t=" 197980000000" />
    </StreamIndex>
- <StreamIndex Type="audio" Name="audio101_eng"
Language="eng" Subtype="AACL" Chunks="0"
TimeScale="10000000"
Url="QualityLevels ({bitrate})/Fragments(audio101_eng={sta
rt time})">
    <QualityLevel Index="0" Bitrate="64000"
CodecPrivateData="1190" FourCC="AACL" AudioTag="255"
Channels="2" SamplingRate="48000" BitsPerSample="16"
PacketSize="4" />
    <c d="19840000" t=" 188995840000" />
    <c d="19840000" t=" 189015680000" />
    <c d="19840000" t=" 189035520000" />
    <c d="19840000" t=" 189055360000" />
    .
    .
    .
    <c d="19840000" t=" 197943680000" />
    <c d="19840000" t=" 197963520000" />
    <c d="19840000" t=" 197983360000" />
    </StreamIndex>
    </SmoothStreamingMedia>
```

This manifest contains sufficient fragments to allow rewinding the live stream up to 15 minutes. Notably, even if the manifest window definition in the manifest is longer, the client device would not be able to rewind further, since the fragments are not identified.

At 340, the program-specific manifest is transmitted to the client device 150. In some embodiments, the program-specific manifest may be transmitted to another element, such as interface server 120 for example, for eventual transmission to the client device.

In some embodiments, policy server 130 may be used to authorize rewinding to the start of a program. Optionally, policy server 130 may require that alternative content, such as advertising, be inserted or appended into the stream. In such cases, policy server 130 may comprise an Advertising Decision Service/Placement Opportunity Information Service (ADS/POIS), and may work in conjunction with interface server 120.

Policy server 130 may generate a token that is included as a parameter in the request URL., for example:

http://mms.example.com/chA.m3u8?start=2013-04-05T00:01:00 Z&token_id=12345

MMS 140 may recognize the token and request additional policy information and actions to take from policy server 130.

For example, MMS 140 may determine that the session identified by the token requires ad placement, and may make a request to an ADS/POIS to determine ad the appropriate placements.

In another example, the token request model can be used to modify or manage timing parameters. For example, when dictated by policy server 130, MMS 140 may generate a program-specific manifest that contains fragments for a different media stream (e.g., advertising media fragments) interspersed with the desired program fragments.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. The scope of the claims should not be limited by the preferred embodiments set forth in the examples, but should be given the broadest interpretation consistent with the description as a whole.

We claim:

1. A method of providing selective retrieval of a live media stream in progress at a current time, the media stream formed of a plurality of fragments, the method comprising:
    storing, for the plurality of fragments corresponding to a program having a beginning at an initial time, archival manifest information comprising at least one manifest for the media stream beginning at the initial time;
    receiving, from a client device, a request for a portion of the media stream beginning at a selected late-start time later than the initial time and earlier than the current time;
    in one or more computer processors, automatically generating a program-specific late-start time-specific manifest based on the archival manifest information and comprising a subset of the archival manifest information, wherein a chronologically-earliest manifest entry for a chronologically-earliest fragment in the program-specific late-start time-specific manifest corresponds to a selected fragment in the plurality of fragments at the selected late-start time, and wherein a chronologically-latest manifest entry for a chronologically-latest fragment in the program-specific late-start time-specific manifest corresponds to a current fragment in the plurality of fragments; and
    providing the program-specific late-start time-specific manifest to the client device.

2. The method of claim 1, further comprising receiving the plurality of fragments from a media server.

3. The method of claim 1, further comprising receiving the archival manifest information from a media server.

4. The method of claim 2, wherein the media server is an adaptive bitrate streaming server.

5. The method of claim 1, further comprising providing a request URL for the portion of the media stream to the client device.

6. The method of claim 5, wherein the request URL comprises a token that identifies the portion of the media stream.

7. The method of claim 6, wherein the token identifies the selected late-start time.

8. The method of claim 6, wherein the token identifies a rewind window from a current time to the selected late-start time.

9. The method of claim 6, wherein the token comprises an authorization to provide the portion of the media stream.

10. The method of claim 5, wherein the request URL is provided by an interface server.

11. The method of claim 1, further comprising periodically generating the archival manifest information for a preselected number of the plurality of fragments, prior to storing the archival manifest information.

12. The method of claim 1, wherein generating the program-specific late-start time-specific manifest further comprises inserting at least one manifest entry for a media fragment related to a different media stream.

13. The method of claim 1, wherein the media stream is an HTTP Live Streaming stream, wherein the archival manifest information comprises a plurality of manifests each relating to a manifest window, and wherein the program-specific late-start time-specific manifest is generated by identifying a subset of the plurality of manifests that contain fragments beginning at the selected late-start time, and extracting the manifest entries beginning at the selected late-start time from the subset.

14. The method of claim 1, wherein the media stream is a Smooth Streaming stream, wherein the archival manifest information comprises an initial manifest, and wherein the program-specific late-start time-specific manifest is generated beginning from the initial manifest using the plurality of fragments.

15. A manifest modification server for providing selective retrieval over a data network of a live media stream in progress at a current time, the media stream formed of a plurality of fragments, the fragments stored at a media server beginning at an initial time, the server comprising:
   a network interface operatively coupled to the data network;
   a memory; and
   a processor operatively coupled to the memory and the network interface, the processor configured to:
      store, for the plurality of fragments corresponding to a program having a beginning at an initial time, archival manifest information comprising at least one manifest for the media stream beginning at the initial time;
      receive, from a client device, a request for a portion of the media stream beginning at a selected late-start time later than the initial time and earlier than the current time;
      automatically generate a program-specific late-start time-specific manifest based on the archival manifest information and comprising a subset of the archival manifest information, wherein a chronologically-earliest manifest entry for a chronologically-earliest fragment in the program-specific late-start time-specific manifest corresponds to a selected fragment in the plurality of fragments at the selected late-start time, and wherein a chronologically-latest manifest entry for a chronologically-latest fragment in the program-specific late-start time-specific manifest corresponds to a current fragment in the plurality of fragments; and
      transmit the program-specific late-start time-specific manifest to the client device.

16. A non-transitory computer readable medium for storing instructions executable by a computer processor, the instructions when executed for causing the computer processor to perform a method of providing selective retrieval of a live media stream in progress at a current time, the media stream formed of a plurality of fragments, the method comprising:
   storing, for the plurality of fragments corresponding to a program having a beginning at an initial time, archival manifest information comprising at least one manifest for the media stream beginning at the initial time;
   receiving, from a client device, a request for a portion of the media stream beginning at a selected late-start time later than the initial time and earlier than the current time;
   automatically generating a program-specific late-start time-specific manifest based on the archival manifest information and comprising a subset of the archival manifest information, wherein a chronologically-earliest manifest entry for a chronologically-earliest fragment in the program-specific late-start time-specific manifest corresponds to a selected fragment in the plurality of fragments at the selected late-start time, and wherein a chronologically-latest manifest entry for a chronologically-latest fragment in the program-specific late-start time-specific manifest corresponds to a current fragment in the plurality of fragments; and
   providing the program-specific late-start time-specific manifest to the client device.

* * * * *